(12) United States Patent
Ziarnik et al.

(10) Patent No.: US 9,021,193 B2
(45) Date of Patent: Apr. 28, 2015

(54) UTILIZATION OF STORED TIMING DATA TO CONFIGURE A MEMORY CONTROLLER

(75) Inventors: Gregory Ziarnik, Houston, TX (US); Jeffrey Kenline, The Woodlands, TX (US); Jose Sancho-Dominguez, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 690 days.

(21) Appl. No.: 13/260,366

(22) PCT Filed: Jan. 21, 2010

(86) PCT No.: PCT/US2010/021660
§ 371 (c)(1),
(2), (4) Date: Sep. 25, 2011

(87) PCT Pub. No.: WO2011/090479
PCT Pub. Date: Jul. 28, 2011

(65) Prior Publication Data
US 2012/0030418 A1 Feb. 2, 2012

(51) Int. Cl.
*G06F 13/00* (2006.01)
*G06F 3/06* (2006.01)
*G06F 12/00* (2006.01)
*G06F 3/16* (2006.01)
*G06F 13/16* (2006.01)

(52) U.S. Cl.
CPC *G06F 3/06* (2013.01); *G06F 12/00* (2013.10); *G06F 3/16* (2013.01); *G06F 13/1689* (2013.01); *G06F 13/1694* (2013.01)

(58) Field of Classification Search
CPC .................... G06F 3/0629; G06F 12/0646
See application file for complete search history.

(56) References Cited

U.S. PATENT DOCUMENTS

| 5,394,541 | A * | 2/1995 | Chesley et al. ............ 711/167 |
| 6,170,059 | B1 | 1/2001 | Pruett et al. |
| 6,886,109 | B2 | 4/2005 | Olarig et al. |
| 2002/0184579 | A1 * | 12/2002 | Alvarez et al. ............ 714/719 |
| 2004/0158701 | A1 | 8/2004 | Merkin |
| 2006/0064563 | A1 | 3/2006 | Hobson |
| 2007/0239996 | A1 | 10/2007 | Cromer et al. |
| 2009/0070630 | A1 | 3/2009 | Khatri et al. |
| 2009/0164842 | A1 | 6/2009 | Browne et al. |
| 2009/0240903 | A1 | 9/2009 | Sauber et al. |
| 2009/0254732 | A1 * | 10/2009 | Dang et al. ............ 711/172 |
| 2010/0043078 | A1 * | 2/2010 | Estakhri et al. ............ 726/27 |

FOREIGN PATENT DOCUMENTS

CN 101042577 A 9/2007
EP 0549139 A1 6/1993

OTHER PUBLICATIONS

EPO, Extended European Search Report, May 23, 2013, EP App No. 10844105.6.

(Continued)

*Primary Examiner* — Sean D Rossiter
(74) *Attorney, Agent, or Firm* — Hewlett-Packard Patent Department

(57) ABSTRACT

A method for configuring a memory controller including determining whether a serial number of at least one memory module matches a stored serial number corresponding to at least one of the memory module and utilizing a stored timing data to configure the memory controller when the serial number matches the stored serial number corresponding to at least one of the memory module.

13 Claims, 6 Drawing Sheets

(56) References Cited

OTHER PUBLICATIONS

FMA and DIMM serial numbers, http://blogs.sun.com/robj/entry/fma_and_dimm_serial_numbers, Publication Date: Apr. 17, 2008.

ISA/KR, International Search Report dated Sep. 17, 2010, PCT/US2010/021660 filed Jan. 21, 2010.

Office Action, CN Application No. 201080061941.6, Date Issued: May 23, 2014, pp. 1-7.

* cited by examiner

UTILIZATION OF STORED TIMING DATA TO CONFIGURE A MEMORY CONTROLLER

BACKGROUND

A user or a computing machine can configure and initialize one or more of the components of the computing machine. When configuring one or more of the components, the user or the computing machine can access and edit one or more settings corresponding to the components. Utilizing the edited settings, the computing machine can proceed to configure and initialize one or more of the components.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
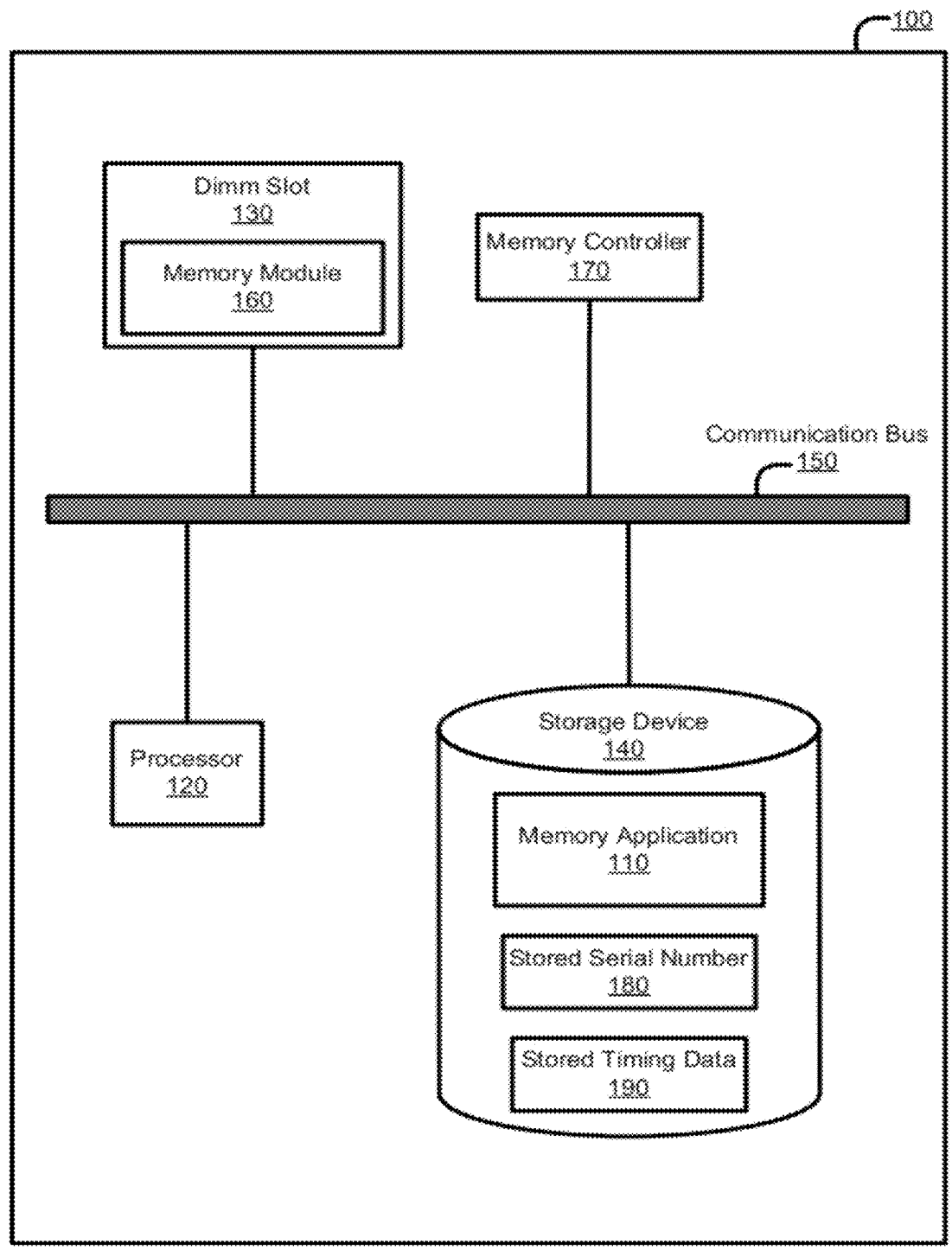
FIG. 1 illustrates a computing machine with at least one memory module and a memory controller according to an embodiment of the invention.

FIG. 1 illustrates a computing machine 100 with at least one memory module 160 and a memory controller 170 according to an embodiment of the invention. In one embodiment, the computing machine 100 is a desktop, laptop/notebook, netbook, and/or any other computing device.

As illustrated in FIG. 1, the computing machine 100 is coupled to a processor 120, at least one dimm slot 130, a memory controller 170, a storage device 140, and a communication bus 150 for the computing machine 100 and/or one or more components of the computing machine 100 to communicate with one another. Additionally, as illustrated in FIG. 1, a memory module 160 can be coupled to at least one of the dimm slot 130.

Further, as shown in FIG. 1, the storage device 140 can store a memory application 110, a stored serial number 180, and/or a stored timing data 190. In other embodiments, the computing machine 100 includes additional components and/or is coupled to additional components in addition to and/or in lieu of those noted above and as illustrated in FIG. 1.

As noted above, the computing machine 100 includes a processor 120. The processor 120 sends data and/or instructions to one or more components of the computing machine 100, such as the storage device 140, a memory module 160, the memory controller 170, and the memory application 110. Additionally, the processor 120 receives data and/or instruction from one or more components of the computing machine 100, such as the memory controller 170, at least one memory module 160, and the memory application 110.

The memory application 110 is an application which can be utilized in conjunction with the processor 120 and at least one dimm slot 130 to determine whether a serial number of a memory module 160 matches a stored serial number 180. Additionally, the memory application 110 can determine whether a memory module 160 is in a last used dimm slot 130. Further, the memory application 110 can configure the memory controller 170 utilizing a stored timing data 190 or with a new timing data.

In one embodiment, the memory application 110 can be launched in response to the computing machine 100 and/or one or more components of the computing machine 100 powering on. In another embodiment, the memory application 110 can be launched in response to the computing machine 100 transitioning to a S0 power state from a S1, S2, S3, S4, and/or S5 power state. In other embodiments, the memory application 110 can be launched in response to the computing machine 100 entering and/or transitioning between any of the power states.

The S0, S1, S2, S3, S4, and the S5 power state are ACPI standardized power configurations for the computing machine 100. When in a S0 power state, one or more components of the computing machine 100 are powered on. When in a S1, S2, 53, S4, and/or a S5 power state, one or more components of the computing machine 100 can be powered off.

The memory application 110 can be firmware which is embedded onto the computing machine 100. In one embodiment, the memory application 110 operates as a BIOS of the computing machine 100. In other embodiments, the memory application 110 is a software application stored on the computing machine 100 within ROM or on the storage device 140 accessible by the computing machine 100 or the memory application 110 is stored on a computer readable medium readable and accessible by the computing machine 100 from a different location.

Additionally, in one embodiment, the storage device 140 is included in the computing machine 100. In other embodiments, the storage device 140 is not included in the computing machine 100, but is accessible to the computing machine 100 utilizing a network interface of the computing machine 100. The network interface can be a wired or wireless network interface card.

In a further embodiment, the memory application 110 is stored and/or accessed through a server coupled through a local area network or a wide area network. The memory application 110 communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

As noted above, the memory application 110 can be utilized in conjunction with the processor 120 to determine whether a serial number of a memory module 160 matches a stored serial number 180. A memory module 160 is a circuit board which includes at least one memory chip. At least one of the memory chips include random access memory configured to store and/or transmit data from the computing machine 100 when accessed.

Additionally, the memory module 160 includes a storage medium which can be configured to store a serial number. In one embodiment, the storage medium of the memory module 160 includes serial presence detect (SPD) space. The SPD space can include nonvolatile storage configured to store a serial number.

For the purposes of this application, a serial number is a sequence of numbers and/or characters utilized to identify a memory module 160. In one embodiment, the serial number can be copied and written to the SPD space of the memory module 160 by the memory application 110. The serial number can be copied from an identification number from another component of the computing machine, such as a MAC address of the network interlace card.

In another embodiment, the serial number can be calculated and/or generated by the memory application 110 and stored on the storage medium of the memory module 160. When calculating and/or generating the serial number, the memory application 110 can utilize one or more algorithms to create the serial number. In one embodiment, utilizing one or more algorithms includes utilizing a random number and/or character generator.

Additionally, if the serial number is not already available and/or stored on one or more components of the computing machine 100, the memory application 110 can store the serial number as a stored serial number 180 on a storage device 140 coupled to the computing machine 100. In one embodiment, the memory application 110 can include the stored serial number in a database accessible to the computing machine 100. In another embodiment, the memory application 110 can store the stored serial number as a file within the storage device 140.

When determining whether a serial number of a memory module 160 matches a stored serial number 180, the memory application 110 initially scans at least one dimm slot 130 coupled to the computing machine 100 for a memory module 160. A dimm slot 130 is a component of the computing machine 100 configured to couple and interface a memory module 160 to the computing machine 100.

In one embodiment, at least one dimm slot 130 can be integrated as part of the computing machine 100. In another embodiment, at least one dimm slot 130 can be coupled to another component of the computing machine 100, such as a motherboard and/or a printed circuit board.

If a memory module 160 is determined to be present in at least one of the dimm slot 130, the memory application 110 can scan the storage medium of the memory module 160 for a serial number. If the storage medium of the memory module 160 does not include a serial number, the memory application 110 will determine that the memory module 160 is presented to the computing machine 100 for a first time and proceed to calculate, generate, and/or copy a serial number onto the storage medium of the memory module 160 for subsequent identification of the memory module 160.

If the storage medium of the memory module 160 already includes a serial number, the memory application 110 will proceed to compare the serial number of the memory module 160 to a stored serial number 180. A stored serial number 180 is a serial number of a memory module 160 that was previously and/or last used with the computing machine 100.

As illustrated in FIG. 1, in one embodiment, the stored serial number 180 can be stored on the storage device 140. In another embodiment, as noted above, the stored serial number 180 can be an identification number of another component of the computing machine 100 and the identification number is stored on the other component.

If the serial number of a memory module 160 matches the stored serial number 180, the memory application 110 can proceed to use a stored timing data 190 when configuring and/or initializing a memory controller 170. In one embodiment, the memory application 110 can additionally determine whether the memory module 160 is in a last used dimm slot 130 before utilizing the stored timing data 190 to configure and/or initialize the memory controller 170.

A stored timing data 190 is a timing data which was previously calculated and/or stored by the memory application 110. Additionally, the stored timing data 190 can be downloaded from another device and/or stored on one or more components of the computing machine 100.

When determining whether the memory module 160 is in a last used dimm slot, the memory application 110 can scan at least one dimm slot 130 to determine which of the dimm slots 130 the corresponding memory module 160 is present in. Once the memory application 110 has identified the corresponding dimm slot 130, the memory application 110 can compare the corresponding dimm slot 130 to a last used dimm slot listed.

The last used dimm slot can be listed and/or stored on one or more components of the computing machine 100, such as the storage device 140. In one embodiment, the last used dimm slot can be listed in a database accessible to the computing machine 100. The database can include entries for the dimm slots 130 of the computing machine 100 and list the last memory module used in the corresponding dimm slot 130. Additionally, information of the last used dimm slot can be listed and/or stored on the storage medium of the corresponding memory module 160.

In one embodiment, if more than one memory module 160 is coupled to the computing machine 100, the memory application 110 can repeat the process noted above for each memory module 160 to insure that the serial number of all of the memory modules 160 match stored serials and that the memory modules 160 are all in a last used dimm slot before proceeding to utilize the stored timing data 190 to configure and/or initialize the memory controller 170.

In another embodiment, if the memory application 110 determines that the serial number of the memory module 160 does not match the stored serial number 180 or if the memory module 160 is not in a last used dimm slot 130, the memory application 110 will proceed to identify and/or calculate a new timing data to utilize when configuring the memory controller 170.

A memory controller 170 is a component of the computing machine 100 configured to manage the flow of data received from and/or sent to at least one memory module 160. The memory controller 170 can be configured by the memory application 110 when the computing machine 100 enters and/or transitions from one or more power states.

In one embodiment, when configuring the memory controller 170, the memory application 110 uses timing parameters from a timing data to specify timings to be utilized on parameters of the memory controller 170 when data is written to and/or read from at least one memory module 160. The memory application 110 can access one or more parameters of at least one memory module 160 and proceed to define and/or set timings for the parameters.

For the purposes of this application, a timing data includes one or more timing parameters for at least one memory module 160. Additionally, for the purposes of this application, a timing parameter can include one or more timings utilized for a corresponding parameter. In one embodiment, a timing parameter can be a timing delay. One or more timing parameters can be predefined by a manufacturer, calculated, and/or identified by the memory application 110.

In one embodiment, a parameter of at least one memory module 160 can include a CAS latency, a row address to column delay time, a row precharge time, and/or a row active time. As a result, the timing data includes timing parameters specifying a timing delay for the CAS latency, a timing for the row address to column, a timing for the row precharge, and/or a timing for the row active. In other embodiments, the timing data can include additional timings utilized for additional parameters of at least one memory module 160 in addition to and/or in lieu of those noted above.

Additionally, the timing data can be calculated by executing one or more timing algorithms on at least one memory module 160. A timing algorithm is a process, function, and/or sequence which the memory application 110 and/or the processor 120 can execute with a timing parameter to determine whether data can successfully be written to and/or read from at least one memory module 160.

When executing one or more timing algorithms, the memory application 110 utilizes a range of timings for the different parameters of the memory modules to determine whether data can successfully be written to and/or read from at least one memory module 160 utilizing the timings.

Utilizing the results from the timing algorithms, the memory application 110 can identify an average and/or median timing for a corresponding parameter where data can successfully be written to and/or read from at least one memory module 160. The average and/or median timing is then identified by the memory application 110 as a timing parameter for the corresponding parameter.

The memory application 110 can repeat this process for each of the parameters of at least one memory module 160 to determine timing parameters for one or more of the parameters. The memory application 110 can then proceed to utilize a collection of the identified timing parameters as the timing data to configure the memory controller 170.

Additionally, once the timing data has been identified, the timing data can be stored for future use as a stored timing data 190. In other embodiments, the memory application 110 can calculate, define, and/or determine additional factors or variables to be utilized when configuring the memory controller 170.

Figure 2:
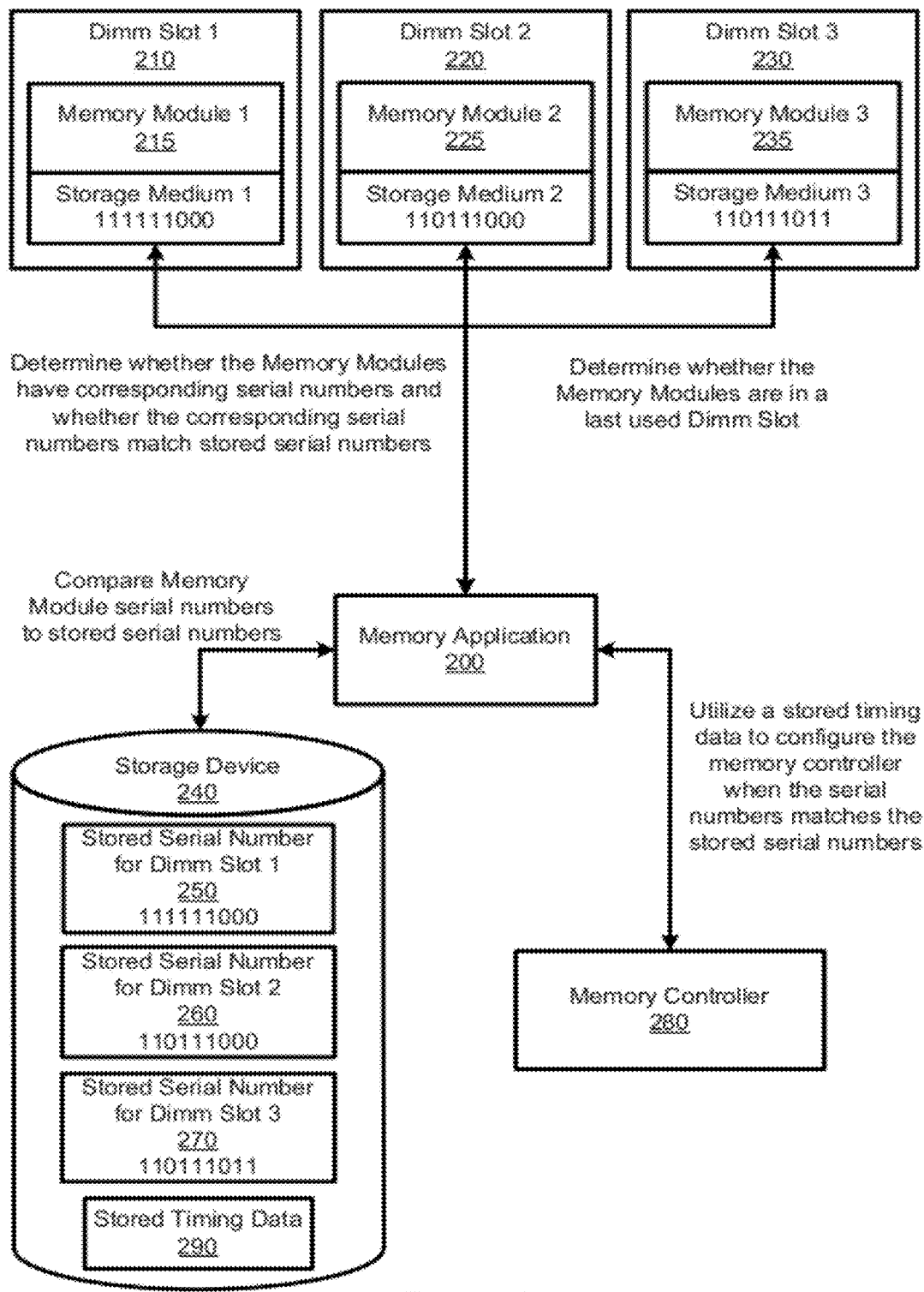
FIG. 2 illustrates a block diagram of a memory application configuring a memory controller according to an embodiment of the invention.

FIG. 2 illustrates a block diagram of a memory application 200 configuring a memory controller 280 according to an embodiment of the invention. As noted above, in response to a computing machine entering and/or transitioning into one or more power states, a memory controller 280 can be configured.

As illustrated in FIG. 2, when configuring the memory controller 280, the memory application 200 can initially access at least one memory module 215, 225, 236, coupled to at least one dimm slot 210, 220, 230. When accessing the dimm slots, the memory application 200 determines that memory module 1 215 is coupled to dimm slot 1 210, memory module 2 225 is coupled to dimm slot 2 220, and memory module 3 235 is coupled to dimm slot 3 230.

Once the memory application 200 has identified that at least one memory module is coupled to at least one dimm slot, the memory application 200 proceeds to determine whether the memory modules have corresponding serial numbers and whether the corresponding serial numbers match stored serial numbers. Additionally, as illustrated in FIG. 2, the memory application 200 can additionally determine whether the memory modules are in a last used dimm slot.

As shown in the present embodiment, the memory application 200 accesses storage medium 1 of memory module 1 215 and determines that memory module 1 215 has a serial number of 111111000. As noted above, in one embodiment, the storage medium of a memory module can include serial presence detect (SPD) space and the serial number of the memory module can be stored in the SPD space.

After identifying the serial number of memory module 1 215, the memory application compares the serial number to a stored serial number. In one embodiment, as illustrated in FIG. 2, the stored serial can be stored on a storage device 240 coupled to the computing machine. In other embodiments, a stored serial number can be an identification number of another component of the computing machine, stored by the other component.

As shown in the present embodiment, the memory application 200 accesses the storage device 240 and finds that the stored serial number 215 for a memory module last used in Dimm Slot 1 is 111111000. As a result, the memory application 210 determines that the serial number of memory module 1 215 matches a stored serial number. Additionally, the memory application 210 determines that memory module 1 is in the last used Dimm Slot 1 210.

As illustrated in FIG. 2, in one embodiment, when identifying which dimm slot a memory module was last used in, information of the last used dimm slot for a memory module can be stored on the storage device 240 of the computing machine. In another embodiment, information of the last used dimm slot can be stored on a corresponding storage medium of the memory module.

After identifying that the serial number of memory module 1 215 matches the stored serial number 250 and that memory module 1 215 is in a last used dimm slot, the memory application 200 then proceeds to determine whether memory module 2 225 and memory module 3 235 include a serial number, whether the serial numbers match of the memory modules match stored serial numbers, and/or whether the memory modules are in a last used dimm slot.

As illustrated in FIG. 2, the memory application 200 accesses the storage medium of memory module 2 225 and memory 3 235. Additionally, the memory application 200 determines that the serial number for memory module 2 225 is 110111000 and the serial number for memory module 3 235 is 110111011. Further, the memory application 200 accesses the storage device 240 and determines that the stored serial number 260 for Dimm Slot 2 is 110111000. Additionally, the stored serial number 270 for Dimm Slot 3 is 110111011.

As a result, the memory application 200 determines that the serial number of memory module 2 225 matches the stored serial 260 corresponding to memory module 2 225. Additionally, the memory application 200 determines that memory module 2 225 is in the last used Dimm Slot 2. Further, the memory application 200 determines that the serial number of memory module 3 235 matches the stored serial 270 corresponding to memory module 3 235 and that memory module 3 235 is in the last used Dimm Slot 3 230.

In response to determining that the serial of all of the memory modules match stored serial numbers and that the memory modules are all in a last used dimm slot, the memory application 200 proceeds to utilize a stored timing data to configure a memory controller 280 of the computing machine. As noted above, the stored timing data includes timings for one or more parameters of the memory modules.

In another embodiment, if any of the memory modules have a serial number which does not match a corresponding stored serial number and/or if any of the memory modules are not in a last used dimm slot, the memory application 200 can proceed to identify a new timing data to be used when configuring the memory controller 280.

Figure 3:
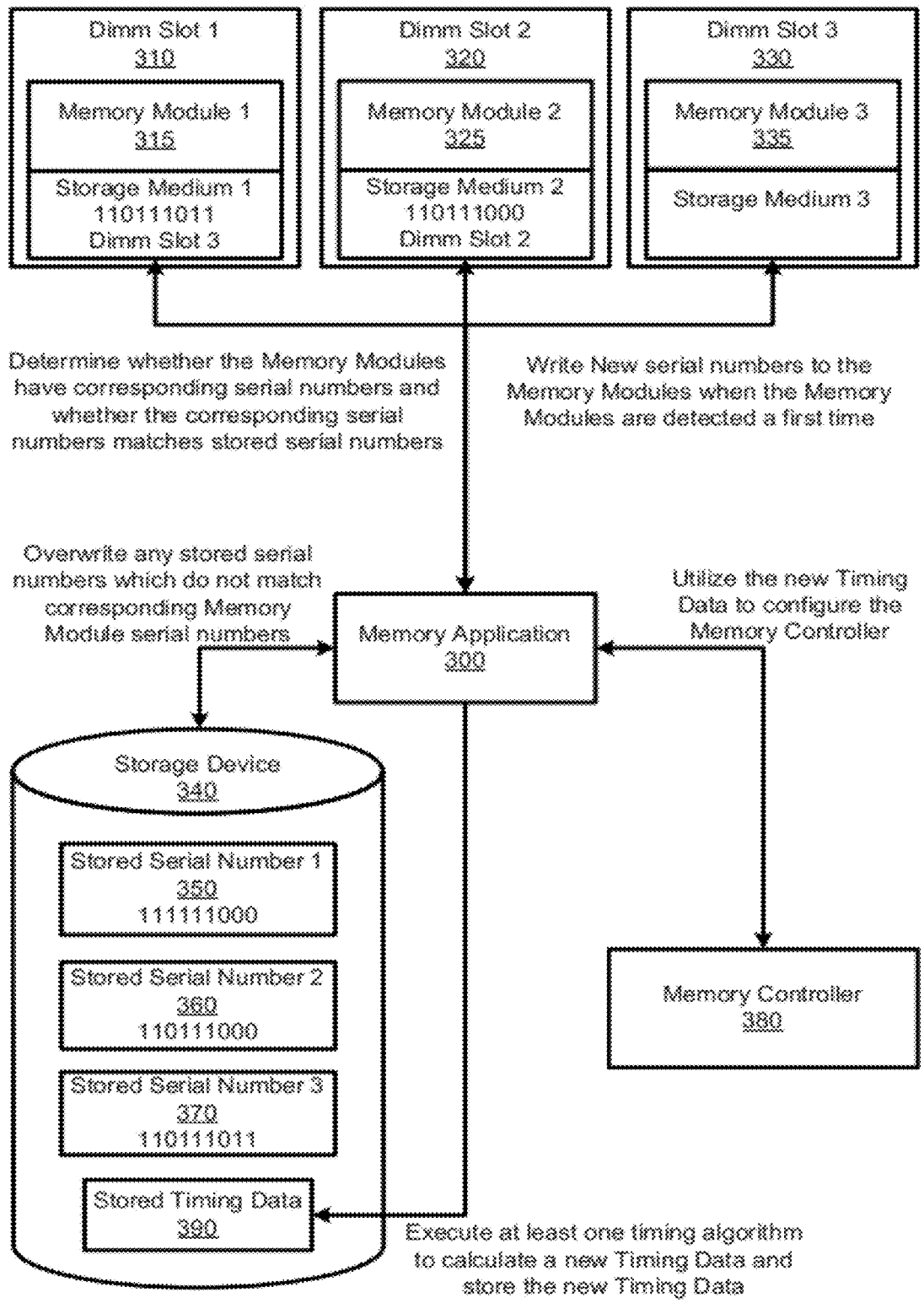
FIG. 3 illustrates a block diagram of a memory application configuring a memory controller according to another embodiment of the invention.

FIG. 3 illustrates a block diagram of a memory application 300 configuring a memory controller 380 according to another embodiment of the invention. In one embodiment, if the memory application 300 determines that at least one memory module has a serial number which does not match a stored serial number and/or if the memory application 300 determines that at least one of the memory modules are not in a last used dimm slot, then the memory application 300 will proceed to identify a new timing data to be utilized when configuring the memory controller 380.

For the purposes of this application, a serial number of a memory module may not match a stored serial number when a memory module is replaced with another memory module, when the memory module is moved to another dimm slot, and/or when the memory module is coupled to a computing machine for a first time.

As shown in FIG. 3, the memory application 300 accesses Dimm Slot 1 310, Dimm Slot 2 320, and Dimm Slot 3 330 on a computing machine and determines that the dimm slots have memory modules coupled to the dimm slots. The memory application 300 proceeds to determine whether the memory modules have corresponding serial numbers and whether the corresponding serial numbers match stored serial numbers.

As illustrated in the present embodiment, the memory application 300 accesses storage medium 1 of memory module 1 315 and determines that memory module 1 315 has a serial number of 110111011. The memory application 300 then proceeds to access a storage device 340 of the computing machine to determine whether the serial number of memory module 1 315 matches stored serial number 1 350, 111111000. In other embodiments, the memory application 300 can access additional components of the computing machine and identification numbers of the additional components to compare the serial number of memory module 1 315 with.

As shown in FIG. 3, the memory application 300 determines that the serial number of memory module 1 315, 110111011, does not matched the stored serial number 1 350, 111111000. Additionally, the memory application 300 determines the storage medium of memory module 1 315 lists that memory module 1 315 was last used in Dimm Slot 3 330. As a result, in response to the serial number of a memory module not matching a corresponding stored serial number and/or in response to a memory module not being in a last used dimm slot, the memory application 300 proceeds to identify a new timing data to use when configuring a memory controller 380.

As noted above, when identifying a new timing data, the memory application 300 executes at least one timing algorithm on the memory modules (memory module 1 310, memory module 2 320, and memory module 3 330) coupled to the computing machine.

In one embodiment, the memory application 300 uses a range of timings for a parameter of the memory modules when executing the timing algorithms to identify a successful range of timings where data can successfully be written to and read from the memory modules. The memory application 300 then identifies an average and/or a median successful timing from the successful range of timing and uses the average and/or median successful timing as a timing parameter for the corresponding parameter.

In one embodiment, the memory application 300 identifies a timing parameter for the CAS latency parameter of the memory modules. The memory application 300 utilizes a timing delay range from 10 milliseconds up to 2 seconds as timings for the CAS latency parameter of the memory modules. The memory application 300 uses the range of timing delays when executing one or more of the timing algorithms on memory module 1 315, memory module 2 325, and memory module 3 335. In one embodiment, the memory application 300 determines that data was successfully written to and read from the memory modules utilizing timing delays from a range of 10 milliseconds up to 1 second.

The memory application 300 then identifies that an average and/or median successful timing delay of 500 milliseconds can be used as a timing delay and as the timing parameter for the CAS latency parameter of the memory modules.

The memory application 300 can repeat this process for each of the parameters of the memory modules to identify additional corresponding timing parameters. The collection of average and/or median successful timings for the corresponding parameters are then used as timing parameters for the new timing data.

In another embodiment, when identifying a new timing data, the memory application 300 can consider a frequency of the memory modules and access a timing table when identifying a new timing data. In other embodiments, the memory application 300 can identify a new timing data utilizing additional methods and/or in consideration of additional factors in addition to and/or in lieu of those noted above.

The memory application 300 can then utilize the new timing data to configure the memory controller 380. When configuring the memory controller 380 with the new timing data, the memory application 300 loads the timing parameters previously identified from the memory modules onto the memory controller 380. The memory controller 380 can then utilize the timings with the parameters of the memory modules when writing data to and/or reading data from the memory modules.

Further, once the memory application 300 has identified the new timing data, the memory application 300 stores the new timing data for future configurations of the memory controller 380. In one embodiment, a stored timing data 390 can be overwritten with the new timing data.

In addition, in one embodiment, when the memory application 300 determines that the serial number of a memory module does not match a corresponding stored serial number, the memory application 300 can store the serial number of the memory module for subsequent comparisons when determining whether to use a stored timing data or calculate a new timing data.

As shown in FIG. 3, because the serial number of memory module 1 315 does not match the stored serial 315 corresponding to memory module 1, the memory application can overwrite the stored serial 315 with 110111011. Additionally, the memory application 300 can update the storage medium of memory module 1 to reflect that the last used dimm slot for memory module 1 is Dimm Slot 1 310.

The memory application 300 then proceeds to determine whether a serial number of memory module 2 325 and memory module 3 335 matches stored serial numbers corresponding to the memory modules. Additionally, the memory application 300 determines whether the memory modules are in a last used dimm slot.

As illustrated in FIG. 3, the memory application 300 determines that the serial number of memory module 2 325, 110111000, matches the stored serial number 360, 110111000, corresponding to memory module 2 325. Additionally, the memory application 300 determines that the last used dimm slot listed in the storage medium of memory module 2 325 is accurately listed as Dimm Slot 2 320. As a result, the memory application 300 does not update a stored serial number 360 corresponding to memory module 2 325 and the memory application 300 does not update the last used dimm slot listed by memory module 2 325.

The memory application 300 then proceeds to memory module 3 335 and determines that memory module 3 335 does not have a serial number listed. As a result, the memory application 300 determines that memory module 3 335 is detected and coupled to the computing machine for a first time. The memory application 300 proceeds to write a new serial number to memory module 3 335. As noted above, the new serial number can be calculated and/or generated by the memory application 300. Additionally, the new serial number can be copied from an identification number of another component of the computing machine.

Figure 4:
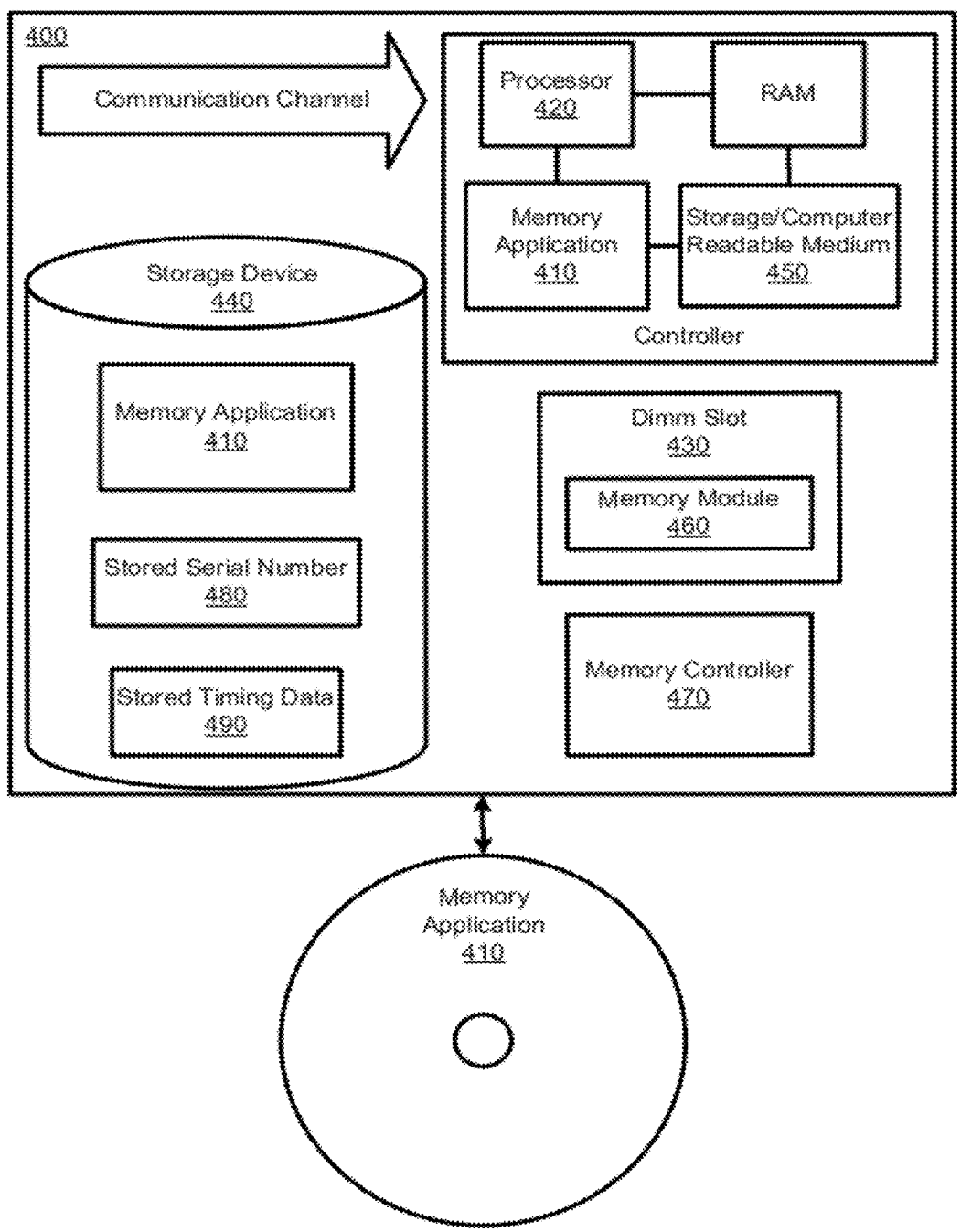
FIG. 4 illustrates a computing machine with an embedded memory application and a memory application stored on a removable medium being accessed by the computing machine according to an embodiment of the invention.

FIG. 4 illustrates a computing machine 400 with an embedded memory application 410 and a memory application 410 stored on a removable medium being accessed by the computing machine 400 according to an embodiment of the invention. For the purposes of this description, a removable medium is any tangible apparatus that contains, stores, communicates, or transports the application for use by or in connection with the computing machine 400. As noted above, in one embodiment, the memory application 410 is firmware that is embedded into one or more components of the computing machine 400 as ROM. In other embodiments, the memory application 410 is a software application which is stored and accessed from a hard drive, a compact disc, a flash disk, a network drive or any other form of computer readable medium that is coupled to the computing machine 400.

Figure 5:
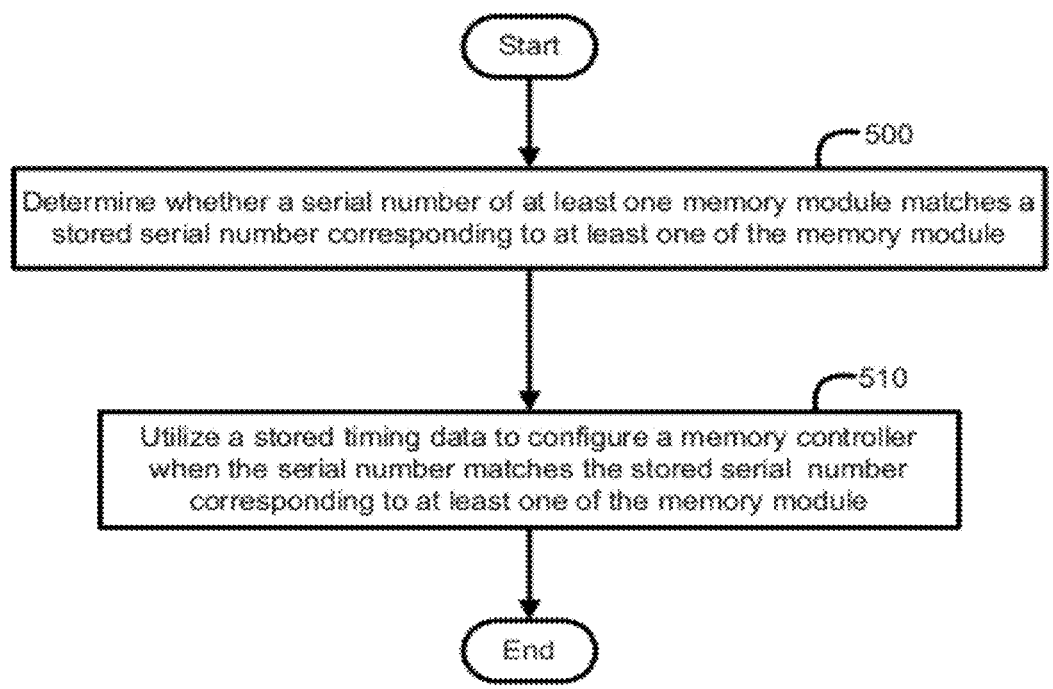
FIG. 5 is a flow chart illustrating a method for configuring a memory controller according to an embodiment of the invention.

FIG. 5 is a flow chart illustrating a method for configuring a memory controller according to an embodiment of the invention. The method of FIG. 5 uses a computing machine coupled to at least one dimm slot, at least one memory module, a processor, and a memory application. In other embodiments, the method of FIG. 5 uses additional components and/or devices in addition to and/or in lieu of those noted above and illustrated in FIGS. 1, 2, 3, and 4.

As noted above, the memory application can be a BIOS of the computing machine and is launched when the memory enters and/or transitions into a S0 power state from a S1, S2, S3, S4, 35 and/or a power off power state. The memory application will initially scan at least one dimm slot on the computing machine to determine whether at least one dimm slot is coupled.

If at least one memory module is coupled to a dimm slot of the computing machine, the memory application will proceed to access a storage medium of a memory module to determine whether the memory module has a serial number listed. In one embodiment, the storage medium of the memory module can include serial presence detect (SPD) space.

If a serial number is not found to be listed for the memory module, the memory application determines that the memory module is coupled to the computing machine a first time and proceeds to assign a serial number for the memory module. When assigning a memory module a serial number, the memory application can calculate and/or generate the serial number utilizing one or more algorithms.

Further, the memory application can store the serial number of the memory module for subsequent comparisons. In other embodiments, the memory application can copy an identification number stored and/or used by another component of the computing machine and utilize the identification number as the serial number for the memory module.

In another embodiment, if the memory application finds a serial number on the storage medium of the memory module, the memory application will proceed to determine whether the serial number of the corresponding memory module matches a stored serial number corresponding to at least one of the memory module 500.

As noted above, the serial number of the memory module can be an identification number of another component of the computing machine or the serial number can be stored on a storage device coupled to the computing machine. As a result, the memory application will scan the storage device and components of the computing machine for a stored serial number and/or a stored identification number which matches the serial number of the memory module.

In one embodiment, the memory application can additionally determine whether the corresponding memory module is in a last used dimm slot. If the serial number matches a stored serial number and/or if the memory module is in a last used dimm slot, the memory application can proceed to utilize a stored timing data to configure a memory controller 510. As noted above, a stored timing data corresponds to timing parameters previously calculated and utilized when configuring the memory controller.

In one embodiment, if the computing machine includes more than one dimm slot and more than one memory module is coupled to the computing machine, the memory application can ensure the serial numbers of all of the memory modules match stored serial numbers and that all of the memory modules are in a last used dimm slot before utilizing a stored timing data to configure the memory controller.

In another embodiment, if the memory application determines that at least one of the memory module does not have a serial number, if the serial does not match a stored serial number, and/or if at least one of the memory module are not in a last used dimm slot, the memory application can proceed to identify a new timing data to be utilized when configuring the memory controller.

When identifying the new timing data, the memory application identifies one or more timing parameters. As noted above, a timing parameter includes a timing utilized for a parameter of one or more memory modules. The memory application can identify a timing utilized for a parameter of the memory modules by executing one or more timing algorithms utilizing a range timings. The memory application can then proceed to identify a successful timing range where data was successfully written to and read from the memory modules.

Utilizing the successful timing range, the memory application can identify and utilize an average and/or median successful timing as a timing parameter for the corresponding parameter. The memory application can repeat this to identify additional timing parameters for additional parameters of the memory modules. In one embodiment, the memory application then utilizes the collection of timing parameters as the new timing data. The new timing data can then be stored for subsequent configurations of the memory controller.

Additionally, if the memory application determines that the serial number of a memory module does not match a stored serial number, the memory application can proceed to store the serial number of the corresponding memory module. Further, if the memory application determines that a memory module is not in a last used dimm slot, the memory application can proceed to update information specifying a last used dimm for a corresponding memory module. The information specifying the last used dimm slot for a corresponding memory module can be stored on the corresponding memory module or a component of the computing machine.

The method is then complete or the memory application can repeat the method disclosed above when entering and/or transitioning into a S0 power state from a S1, S2, S3, S4, 55 and/or power off power state. In other embodiments, the method of FIG. 5 includes additional steps in addition to and/or in lieu of those depicted in FIG. 5.

Figure 6:
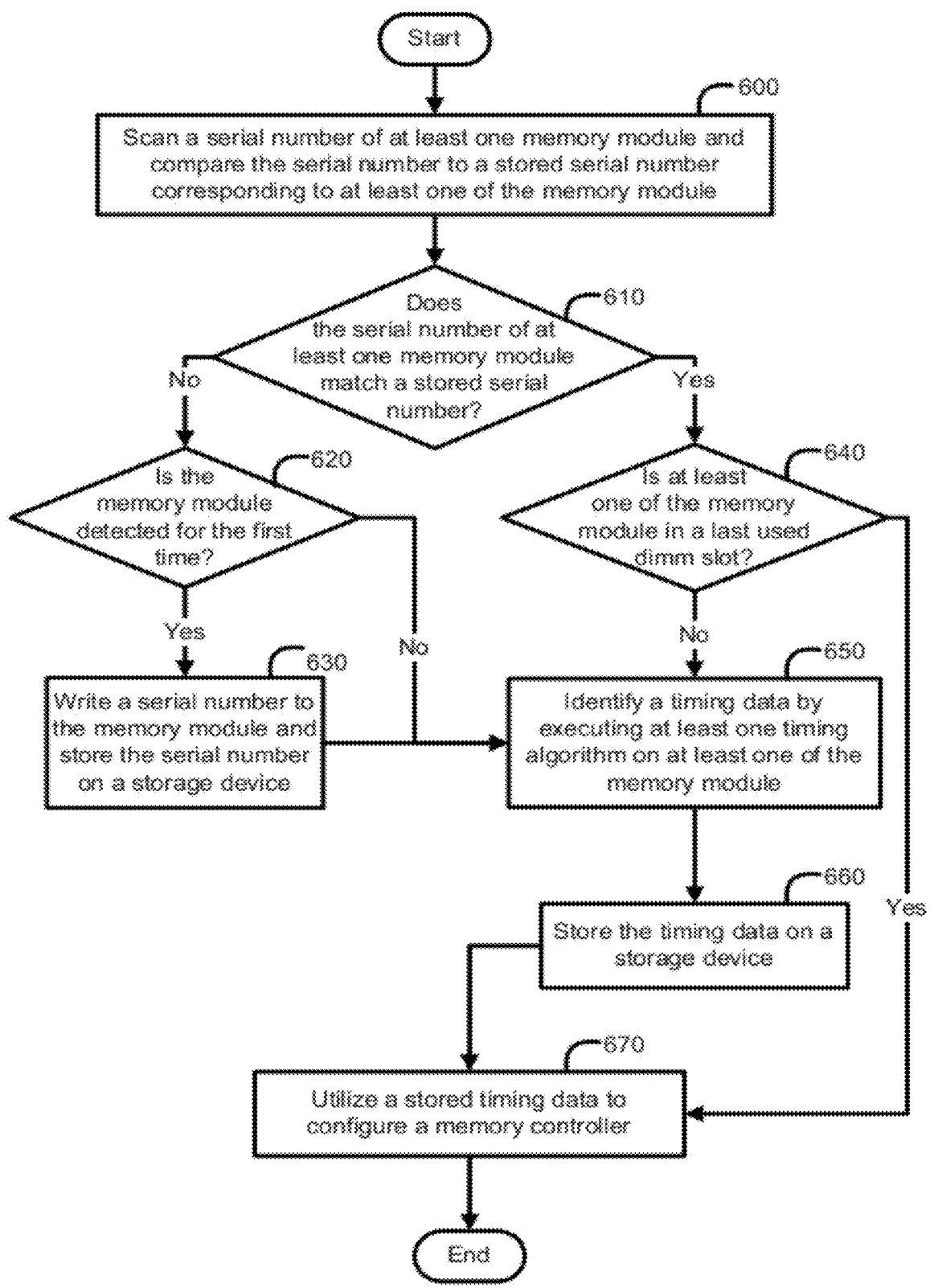
FIG. 6 is a flow chart illustrating a method for configuring a memory controller according to another embodiment of the invention.

FIG. 6 is a flow chart illustrating a method for configuring a memory controller according to another embodiment of the invention. Similar to the method disclosed in FIG. 5, the method of FIG. 6 uses a computing machine coupled to at least one dimm slot, at least one memory module, a processor, and a memory application. In other embodiments, the method of FIG. 6 uses additional components and/or devices in addition to and/or in lieu of those noted above and illustrated in FIGS. 1, 2, 3, and 4.

As noted above, in response to the computing machine entering and/or transitioning into one or more power states, a memory application can be launched and configured to scan a serial number of at least one memory module and compare the serial number to a stored serial number corresponding to at least one of the memory module 600.

The memory application can determine whether the serial number of at least one memory module matches a stored serial number 610? In one embodiment, if more than one memory module is coupled to the computing machine the memory application determines whether the serial number of all of the corresponding memory modules match stored serial numbers.

If the memory application determines that a serial number of a memory module matches a stored serial number, the memory application proceeds to determine whether at least one of the memory modules is in a last used dimm slot 640. In another embodiment, the memory application will check and insure that the serial number of all of the memory modules match stored serial numbers before continuing to determine whether at least one of the memory module in a last used dimm slot 640.

When determining whether a memory module is in a last used dimm slot, the memory application can scan for a last used dimm slot for the corresponding memory module listed in the storage medium of the memory module or on the storage device coupled to the computing machine.

In one embodiment, if at least one of the memory modules is in a last used dimm slot, the memory application can continue to utilize a stored timing data to configure a memory controller of the memory application 670. As noted above, the stored timing data includes timing parameters which were previously used and/or calculated by the memory application. In another embodiment, the memory application will ensure that all of the memory modules coupled to the computing machine are in a last used dimm slot before proceeding to utilize a stored timing data to configure a memory controller of the memory application 670.

In other embodiments, if the memory application previously determined that a memory module does not include a serial number and/or if the serial number does not match a stored serial number, the memory application proceeds to determine whether the memory module is being coupled to the computing machine is being detected for the first time 620?

As noted above, if the memory application finds that a memory module does not have a serial number listed, the memory application will determine that the memory module is detected by the computing machine a first time and proceed to calculate, generate, and/or a copy a serial number onto the memory module. As noted above, the storage medium can include non volatile memory that includes serial presence detect (SPD) space and the serial number can be written and stored on the SPD space.

Additionally, the serial number can be stored as a stored serial number on a storage device and/or on one or more components of the computing machine 630. The memory application can then proceed to identify a new timing data by executing at least one timing algorithm on one or more parameters of at least one of the memory module 650. As noted above, the memory application uses a range of timings when executing at least one timing algorithm on one or more parameters.

In another embodiment, if the memory application finds a serial number listed on the memory module and the memory application determines that the serial number does not match a stored serial number, the memory application can store the serial number as a stored serial number and/or overwrite a previously stored serial number on one or more components of the computing machine. The memory application can then proceed to identify a new timing data by executing at least one timing algorithm on at least one of the memory module 650.

Once the timing parameters for the timing data have been determined, the memory application can then store the new timing data on a storage device for subsequent use 660. Utilizing the new timing data which has been stored, the memory application can proceed to configure the memory controller 670.

The method is then complete or the memory application can repeat the method disclosed above in response to the computing machine entering and/or transitioning into one or more power states. In other embodiments, the method of FIG. 6 includes additional steps in addition to and/or in lieu of those depicted in FIG. 6.

By utilizing a stored timing data to configure a memory module when a serial number of a memory module matches a stored serial number, time can be saved and efficiency can be increased when powering on a computing machine. Additionally, by calculating a new timing data and storing the new timing data when a serial number of a memory module does not match a stored serial number and/or when a memory module is not in a last used dimm slot, stability and security can be increased for the computing machine.

What is claimed is:

1. A method for configuring a memory controller comprising:
    determining a serial number of a first memory module coupled to the memory controller, the first memory module being associated with timing data;
    determining when the serial number of the first memory module does not match a stored serial number of any memory module that is previously coupled to the memory controller; and then
    executing at least one timing algorithm to calculate new timing data for configuring the memory controller to successfully use the first memory module, the new timing data being calculated without having been previously associated with the first memory module.

2. The method for configuring a memory controller of claim 1, further comprising storing the new timing data and utilizing the new timing data to configure the memory controller.

3. The method for configuring a memory controller of claim 1, further comprising storing the serial number of the first memory module when the serial number of the first memory module does not match the stored serial number of any memory module that is previously coupled to the memory controller.

4. The method for configuring a memory controller of claim 1, wherein determining when the serial number of the first memory module does not match a stored serial number includes comparing the serial number of the first memory module to the stored serial number of any memory module that is previously coupled to the memory controller.

5. A computing machine comprising:
    a processor;

at least one memory module coupled to a memory controller, each of the at least one memory modules being associated with timing data; and a memory application executed by the processor from computer readable memory and configured to:
- determine a serial number of a first memory module coupled to the memory controller;
- determine when the serial number of the first memory module does not match a stored serial number of any memory module that is previously coupled to the memory controller; and then
- execute at least one timing algorithm to calculate new timing data for configuring the memory controller to successfully use the first memory module, the new timing data being calculated without having been previously associated with the first memory module.

6. The computing machine of claim 5, wherein the serial number of the first memory module is stored on a storage medium included in the at least one of the memory modules coupled to the memory controller.

7. The computing machine of claim 6, wherein the serial number of the first memory module is written to the storage medium by the computing machine when the computing machine detects at least one of the memory modules a first time.

8. The computing machine of claim 5, wherein the serial number of the first memory module corresponds to an identification number of a component of the computing machine.

9. The computing machine of claim 5, wherein the memory application operates as a BIOS of the computing machine when the computing machine powers on.

10. The computing machine of claim 5, wherein the memory application executed by the processor is further configured to store the new timing data and use the new timing data to configure the memory controller when the serial number of the first memory module does not match a stored serial number of any memory module that is previously coupled to the memory controller.

11. A computer-readable program in a non-transitory computer-readable medium comprising:
a memory application configured to:
- scan a first memory module of one or more memory modules coupled to a memory controller for a serial number and determine when the serial number of the first memory module does not match a stored serial number of any memory module that is previously coupled with the memory controller, wherein each of the one or more memory module is associated with timing data; and
- execute at least one timing algorithm to calculate new timing data for configuring the memory controller to successfully use the first memory module, the new timing data being calculated without having been previously associated with the first memory module.

12. The computer-readable program in the non-transitory computer-readable medium of claim 11, wherein the memory application is further configured to determine whether the first memory module is in a last used DIMM slot when the serial number of the first memory module does not match a stored serial number of any memory module that is previously coupled with the memory controller.

13. The computer-readable program in the non-transitory computer-readable medium of claim 12, wherein the memory application is additionally configured to store the new timing data and uses the new timing data to configure a memory controller when the first memory module is not in the last used DIMM slot.

* * * * *